United States Patent Office 2,786,827
Patented Mar. 26, 1957

2,786,827

PHOSPHORUS OXYCHLORIDE-HALOGEN-CONTAINING TELOMERS AND THEIR PREPARATION

William S. Barnhart, Cranford, N. J., assignor to The M. W. Kellogg Company, Jersey City, N. J., a corporation of Delaware No Drawing. Application November 18, 1953,
Serial No. 392,995

18 Claims. (Cl. 260—92.1)

This invention relates to new and useful low molecular weight, halogen-containing telomers and their preparation. In one aspect, this invention relates to a method for preparing liquid, grease and wax-like halogen-containing telomers, especially the perhalotelomers. In another aspect, the invention relates to new telomers of trifluorochloroethylene in the liquid to wax range of molecular weights.

For the purpose of this invention the term "telomer" means both homotelomers and cotelomers. The term "homotelomer" refers to those telomeric materials containing the same monomer units. The term "cotelomers" refers to those telomeric materials containing monomer units of two or more different monomers. The terms "polymerization" or "telomerization" in their broadest sense include both homopolymerization and copolymerization, and homotelomerization and cotelomerization, respectively.

Homotelomers of halogen-containing ethylenes of an oil, grease or wax-like nature, but of different composition than those disclosed in this invention, have been prepared by telomerizing the halogen-containing ethylenic monomer in the presence of telogens, such as chloroform and carbon tetrachloride. By this prior art method some liquid and oily telomeric materials have been obtained, but the major product of the telomerization is a high molecular weight, non-distillable, wax-like material. The general formula for the prior art product is:

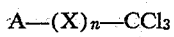

wherein A is a chlorine or hydrogen and X is a halogen-containing ethylenic monomer unit. The high molecular weight telomeric products require pyrolysis to yield liquids, oils or greases and by this treatment are rendered unsaturated and therefore chemically unstable. To make the pyrolyzed fluoroethylenic and chlorofluoroethylenic products of this type resistant to heat, light and chemical attack, fluorination of the unstable products with expensive reagents, such as cobalt trifluoride or chlorine trifluoride, is required.

Liquid, grease and wax-like telomers, particularly the telomers of the fluoroethylenic and chlorofluoroethylenic monomers, may be used in such capacities as plasticizers for various polymers, particularly the halogen-containing polymers, rubber softeners, non-inflammable hydraulic fluids, heat transfer media, lubricants of all types, dielectric fluids for insulating purposes and plotting compounds. In addition the telomers of the present invention may be used as emulsifiers, adhesives and as intermediates for making useful derivatives, such as the organic acids.

An object of the present invention is to provide telomeric material containing new terminal groups.

Another object of this invention is to provide distillable liquid, oil, grease, and wax-like telomeric materials containing new terminal groups.

Another object of this invention is to provide telomeric materials containing halogen of low molecular weight which are compatible with higher molecular weight plastic type polymeric materials containing halogen.

Another object of this invention is to provide telomeric materials containing halogen which are soluble in water and alkaline media.

Another object of this invention is to provide telomeric materials containing halogen which will form emulsions in aqueous and alkaline media.

Another object of this invention is to provide telomeric materials which will emulsify, in aqueous or alkaline media, insoluble polymers with which they are compatible.

Another object of this invention is to provide telomeric materials having terminal groups capable of being hydrolyzed to form a substituted acid.

Another object of this invention is to provide telomeric materials, which are capable of forming metallic salts.

Another object of this invention is to provide telomeric materials, which, owing to their compatibility with high molecular weight polymers containing halogen and the ability of their terminal groups to combine with metals, provide adhesive materials to bind high molecular weight polymers to metals.

Another object of this invention is to provide a method for preparing distillable liquid, grease and wax-like telomeric materials containing halogen by a one step process, the products of which may be readily separated and purified.

Another object of this invention is to provide a new method of preparing perhaloalkyl phosphonic acids.

Another object of this invention is to provide a new method of preparing perhaloalkyl phosphoryl esters.

Another object of this invention is to provide a method for preparing stable liquid, grease and wax-like telomeric materials which, without separation or further treatment, exhibit superior plasticizing properties.

Various other objects and advantages will become apparent to those skilled in the art from the accompanying description and disclosure.

According to this invention, a halogen-containing monomer, or monomers, is telomerized with a phosphoryl halide as the telogen in the presence of a catalyst, to produce an open chain telomer. The telogen, namely the phosphoryl halide, provides the terminal groups, tends to control telomerization and gradually modifies free radical reaction. By varying the amount of telogen used, the telomeric material may be obtained primarily as a liquid or oil, a grease, or a soft wax, all of which are distillable.

The telogen is selected from a group of phosphoryl compounds which contain a

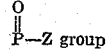

wherein Z is a halogen (Cl, Br, F, and I). The residual bonds are preferably occupied by groups selected from the members consisting of alkoxy radicals, hydroxyl radicals, aryl radicals, alkyl radicals, hydrogen and halogens. Typical examples of these phosphoryl compounds are phosphorus oxychloride, phosphorus oxybromide, phosphorus oxyiodide, phosphorus oxyfluoride, phosphorus oxybromodichloride, dimethyl phosphonyl chloride and diethyl phosphonyl chloride; methane phosphonyl dichloride, ethane phosphonyl dichloride, propane phosphonyl dichloride, isopropane phosphonyl dichloride, isobutane phosphonyl dichloride, isopentane phosphonyl dichloride, cyclohexane phosphonyl dichloride, dimethyl phosphonyl chloride, methylethyl phosphonyl chloride, diethyl phosphonyl chloride, dipropyl phosphonyl chloride, dibutyl phosphonyl chloride, benzene phosphonyl dichloride, 2-methyl benzene phosphonyl dichloride, 3-methyl benzene phosphonyl dichloride, 4-methyl benzene phosphonyl dichloride, 4-methyl benzene bromophosphonyl chloride, 4-methyl benzene phosphonyl dibromide, 2,5-dimethyl benzene phosphonyl dichloride, 4-ethyl benzene phosphonyl dichloride, 2,4,5-trimethyl benzene phosphonyl dichloride, 2,4,6-trimethyl benzene phosphonyl dichloride, naphthalene phosphonyl dichloride, methyl phenyl phosphonyl chloride, ethyl phenyl phosphonyl chloride, diphenyl phosphonyl chloride, bis (2-methyl phenyl) phosphonyl chloride, bis (4-methyl phenyl) phosphonyl chloride, dinaphthalyl phosphonyl chloride, triphenylmethane phosphonyl dichloride, triphenylmethyl hydroxy phosphonyl chloride, bromophosphoric acid, fluorophosphoric acid, chlorofluorophosphoric acid, phosphonic dichloride, phosphinic chloride, phosphonic bromide fluoride, chlorophosphonic acid, phosphonofloridic acid, dimethyl fluorophosphate, diisopropyl chlorophosphate, diethyl fluorophosphate, ethyl butyl fluorophosphate, diisobutyl chlorophosphate, methyl dichloro phosphate, ethyl difluoro phosphate, butyl dichloro phosphate, ethyl dichloro phosphate.

In the case of the organic phosphonyl halides, it is preferred that the organic group or groups have not more than 10 carbon atoms.

The preferred telogen is phosphorus oxychloride, POCl₃, and is prepared by the hydrolysis of PCl₅. Another phosphoryl compound which has been found to be particularly useful is diethoxy phosphonyl chloride (diethyl chlorophosphate). Diethoxy phosphonyl chloride is prepared by reacting ethyl alcohol with phosphorus oxychloride at or below room temperature in the presence of a tertiary organic base, such as pyridine, and an inert solvent, such as benzene.

Generally accepted among those skilled in the art is the concept that compounds which readily homopolymerize or homotelomerize are those that contain $=CH_2$ and/or $=CF_2$ groups. It is also well-known that compounds which will not readily homopolymerize or homotelomerize may be copolymerized or cotelomerized with other monomers. The halo-olefinic compounds which may be used as starting monomers in the present invention are a polymerizable compound containing a double bond between two carbon atoms and at least one halogen atom attached to at least one of the carbon atoms attached to the double bond. The halogen attached to the carbon of the double bond may be fluorine, chlorine, bromine or iodine. Experimental evidence has shown that compounds containing a halogen attached to one of the carbon atoms attached to the double bond is sufficiently stable to halogenation that it may be successfully telomerized according to the teachings of this invention.

The present invention is particularly applicable to the telomerization of perfluorochloro olefins, such as chlorotrifluoroethylene, perfluoro olefins, such as tetrafluoroethylene, chloro olefins, such as vinyl chloride, and fluoro olefins, such as vinylidene fluoride. The invention contemplates the telomerization of various polymerizable halogenated olefins, preferably having not more than 8 carbon atoms per molecules; for example, perfluorobutadiene, α-methyl phenyldifluoroethylene, difluorodichloroethylene, perfluoroacrylonitrile, α-B,B,-trifluorostyrene, perfluorocyclobutene, α-chloro-styrene, 2-chloropropene, vinylidene chloride, vinyl bromide, tetrachloropropene, chlorobutadiene, α-bromostyrene, bromotrifluoroethylene, unsym. dibromodifluoroethylene, trifluoroethylene, vinyl fluoride, etc. As previously mentioned, the present invention applies to the cotelomerization of these monomers with themselves or other monomers, as well as their homotelomerization. For example, the invention applies to the cotelomerization of chlorotrifluoroethylene and tetrafluoroethylene or vinylidene fluoride. In the cotelomerization, the second monomer or comonomer is a halogenated olefin, and preferably an olefin in which the halogen is selected from a group consisting of fluorine and chlorine. The monomers may also be cotelomerized with wide range of compounds which do not readily homopolymerize or homotelomerize. For example, the invention contemplates the cotelomerization of compounds of the nature of sym. dichlorodifluoroethylene and trichloroethylene with such more readily polymerizable monomers as chlorotrifluoroethylene and tetrafluoroethylene.

The compounds formed by the telomerization of halogen-containing olefinic monomers in the presence of a phosphoryl halide have the general formulae:

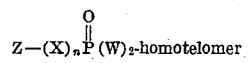

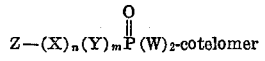

wherein Z is a halogen, i. e., chlorine, fluorine, bromine and iodine, and X and Y are different halogen-containing olefinic monomer units and n and m are integers greater than one, and preferably not greater than 10, and W is selected from the group consisting of a hydroxyl radical, an alkoxy radical, aryl radical, alkyl radical, a halogen, and hydrogen. The monomer units of the telomer are the same as the compound polymerized except that one double bond for each monomer molecule is converted to a single bond.

It is also within the scope of this invention that a halogen, such as iodine, of the monomer unit may be replaced with another halogen donated by the telogen concurrently with the telomerization reaction. In the case of dienes as monomers, double bonds may be halogenated by the telogen concurrently with the telomerization reaction.

The present invention is not limited to use in any one particular type system or apparatus. In one aspect the telomerization may be carried out by means of a batch process which comprises telomerizing the monomer in the presence of a catalyst, a phosphoryl halide, and an inert solvent, such as trichlorotrifluoroethane (Freon 113), if desired, under autogenous pressure.

More particularly, a system designed to withstand moderate pressures, which are autogenous during the telomerization, is flushed out with nitrogen to remove any oxygen and subsequently charged with the catalyst, preferably benzoyl peroxide, a telogen, preferably phosphorus oxychloride, and a solvent, if desired. The system is closed and the haloethylenic monomer, or monomers, is added as a gas under pressure or as a liquid at low temperatures. The mixture is then heated to a temperature between about 0° C. and about 200° C. and preferably between about 25° C. and about 150° C. During the telomerization some type of agitation is preferable but not essential. As the telomerization proceeds, a maximum pressure is soon reached which subsequently slowly subsides. When the pressure ceases to drop, the heat is discontinued and the gaseous materials, such as unreacted monomer, which may be present are bled from the autoclave. These may, if desired, be distilled to separate and recover the unreacted monomer. The product of the telomerization is stripped of the excess phosphorus oxychloride and solvent by heating.

When the phosphoryl halide used in the above described procedure is a phosphorus oxyhalide, such as phosphorus oxychloride, the removal of the impurities from the telomer is governed by the end product desired. The telomer, for example, a haloalkylphosphoryl dihalide, may be purified as such by distillation conducted under anhydrous conditions. On the other hand, the telomer may be recovered in the form of an acid, for example, a haloalkylphosphonic acid, if it is desirable to purify the product under hydrous conditions, such as steam distillation, ether extraction from aqueous solutions or by precipitation from aqueous mixtures.

When the phosphoryl halide used in the above described procedure is an alkyl or dialkylphosphoryl halide, such as diethylphosphonyl chloride, the telomer may be purified in either an anhydrous or hydrous system without substantially hydrolyzing the phosphoryl group. However, the esters formed by the use of an alkyl or dialkylphosphoryl halide as telogens, may be hydrolyzed by treating them with a strong acid, such as sulfuric acid, at a moderately high temperature, e. g., 100° C. to 200° C.

In another embodiment of the invention, the telomerization may be carried out by means of a continuous process comprising feeding the reactants into a reaction zone at a rate determined to maintain consistent proportions of the constituents in the mixture and to produce a residence time of about ½ to 10 hours, preferably about 1 to about 4 hours. The apparatus may be modified so that each ingredient is added individually, or the catalyst may be dissolved in the phosphorus oxychloride, or each may be dissolved in a suitable solvent, or the catalyst and the phosphorus oxychloride may exist in the same solution.

More particularly in a continuous system, reagent tanks for the catalyst, phosphorus oxychloride and the monomer, pipe coil reactor in a heating bath and a cooling coil leading to a product storage tank are used. Nitrogen pressure may be applied to the reagent tanks or to the unit as desired.

Yields, usually above 50 percent and frequently approaching 100 percent based upon the weight of monomer charged, of chlorotrifluoroethylene and tetrafluoroethylene homotelomers have been prepared by the operation of the above procedure.

The mol ratio of phosphoryl halide to monomer employed in these procedures is between about 1:2 and about 20:1, preferably between 1:1 and 10:1 depending upon the products desired and the starting materials used. The optimum mol ratio, for producing primarily telomeric chlorotrifluoroethylene oils and greases, is about 3:1 of the telogen to monomer. The telomerization may be carried out in the presence of a suitable inert solvent, if desired. The term inert solvent means any liquid which does not materially alter the normal telomerization of haloethylenic compounds in the presence of phosphorus oxychloride; such as Freon 113, or tetrachloroethane. It should be noted that water slowly reacts with phosphorus oxychloride to form hydrochloric acid and phosphoric acid and therefore precautions should be taken to provide substantially anhydrous conditions. Glass lined equipment is usually desirable, however, Monel and stainless steel have been used for polymerization and filtration apparatus without noticeable corrosion.

Polymerization catalysts which are not destroyed by $POCl_3$ at temperatures within the operating range and which are soluble in one or more of the constituents of the telomerization mixture may be used in the practice of this invention. For example, the telomerization may be carried out by catalysts with aromatic peroxides, such as benzoyl peroxide, chlorinated aromatic peroxides, such as dichlorobenzoyl peroxide, aliphatic peroxides, such as di-t-butyl peroxide, chlorinated aliphatic peroxides, such as trichloroacetyl peroxide, metal compounds, such as tetraethyl lead. The foregoing are free radical producing catalysts. Other catalysts include gases, such as oxygen, and sunlight.

The reaction occurs essentially as shown below in a typical equation using, chlorotrifluoroethylene and phosphorus oxychloride as an example:

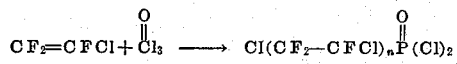

$n=$ an integer from 2 to 20

These telomeric halocarbons may be separated by distillation under anhydrous conditions.

Haloethylenic telomers, telomerized with phosphoryl halides contain

terminal group, which in each case can be hydrolyzed under conventional conditions to form a substituted phosphoric acid. Furthermore the

group, when W is a halogen, may react with amines to form amides, which react with alcohols to form esters, and with mercaptans to form thioesters, under conventional conditions. Not only may the telomer be used as a starting material to form the above recited chemical combinations, but it is contemplated that it may also be used as a telogen for other telomerizations.

The hydrolyzed phosphoryl terminal group of the telomer acts as a typical acid, forming metallic salts with metallic hydroxides or with free metals. If the telomer chain is not too long, i. e., not more than about 10 monomeric units, the telomer molecule may readily be brought into solution in an aqueous or aqueous alkaline media. On the other hand, the solubility of the telomer decreases as the molecular weight or chain length of the telomer increases. As the magnitude of the telomer chain becomes sufficiently great, the organic portion remains insoluble while the terminal group dissolves, and an emulsion results.

The acidic telomer is also capable of emulsifying other polymers with which it is compatible. The polymer to be emulsified is finely divided and added to an emulsion of the telomer or the solvent is added to a mixture of the polymer and telomer. The acidic terminal group of the telomer remains dissolved, while the finely divided polymer particles adhere to the monomer portion of the telomer. An emulsifier for haloolefinic polymers may be used in the polymerization of haloolefines in aqueous media in which adequate contact of the various components is assured. It may also be used in compounding waxes or paints in which an aqueous or alkaline solvent is desired. Or it may be used to facilitate application of a polymer to an object through spraying or dipping.

The ability of the polar terminal group to combine with metals also provides a means of securing the telomer to a metal surface. The telomer is spread over the metal surface and fused or pressed. Another polymer, which is compatible with the telomer, such as a solid homopolymer of trifluorochloroethylene, may then be spread over the surface and the entire polymeric film fused or pressed, thus cementing the film to the metal.

Telomerization with phosphoryl halides adds not only a terminal phosphoryl group to the telomer but also a halogen terminal group to the other end of the telomer. The presence of a chlorine terminal group is particularly advantageous when it is desirable to prepare phosphoryl-containing perfluorochloro telomers. The direct addition of the chlorine during telomerization, eliminates the necessity of stabilizing the telomer by further chlorination or fluorination.

The addition of a bromine or iodine is also advantageous. The bromine group can be replaced with radicals, such as a cyano group, which in turn can be hydrolyzed to form a carboxyl group, which subsequently may be used to form esters. When various types of monomers, which are not completely halogenated are used, the halogen terminal group, will form Grignard intermediates from which alcohols, esters, ethers, acids, various hydrocarbons may be formed.

It has been found that the telomers prepared by the process described in this invention are excellent plasticizers for high molecular weight polymers.

To facilitate a fuller and more complete understanding of the subject matter on this invention and how the herein described invented compounds can be prepared by practice of the present process, certain specific examples herewith follow, but it is to be understood that these examples are provided by way of illustration and should not be considered unnecessarily limiting to the invention.

Example 1

A steel bomb was charged with chlorotrifluoroethylene monomer (116.5 grams), phosphorus oxychloride (306.7 grams), and benzoyl peroxide (4.84 grams) and telomerized at 95° C. under autogenous pressure for four hours. The product was then precipitated from water to yield 65 grams (56%) of a solid low molecular weight telomer in the nature of a wax. Analysis showed a composition of 28.6 percent chlorine, 43.9 percent fluorine and 0.64 percent phosphorus, which corresponds to the average formula

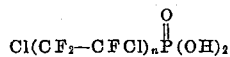

$$Cl(CF_2-CFCl)_n\overset{O}{\underset{\|}{P}}(OH)_2$$

wherein $n=3.5$. This white solid (M. P. 75° C. to 80° C.) was compatible with high molecular weight polymeric chlorotrifluoroethylene and was thermally stable at molding temperatures (245° C.).

Example 2

A steel bomb was charged with 116.5 grams of chlorotrifluoroethylene monomer, and 345 grams diethoxy phosphonyl chloride (diethyl chlorophosphate), and 4.48 grams of benzoyl peroxide. Telomerization was conducted at 95° C., for five hours under a pressure of about 300 pounds per square inch gage. A white insoluble telomer (5 grams) was obtained which was compatible with high molecular weight polymeric chlorotrifluoroethylene.

It is to be understood that various modifications and alterations of conditions and techniques obvious to those skilled in the art may be made in this invention without departing from the scope thereof. To a large extent the conditions of telomerization will depend upon the olefin being telomerized and upon the technique used. For example, with perfluoroethylenes and perfluorochloroethylenes temperatures between about 80° C. and about 125° C. are most satisfactory. In a continuous system somewhat lower residence times are employed than in batch type systems because lower yields are permissible with recycle of unreacted monomer. In autogenous batch type systems the residence time is about four hours, but this depends to a large extent upon the monomer used, and may be as short as 10 minutes without departing from the scope of this invention.

I claim:

1. A process for the production of a distillable open chain telomer which comprises telomerizing a polymerizable halogenated hydrocarbon containing a double bond between two carbon atoms and at least one halogen atom attached to at least one of the carbon atoms of the double bond at a temperature between about 0° C. and about 200° C. for a period of time between about ½ hour and about 10 hours under liquid phase and anhydrous conditions with a free radical producing catalyst effective under the conditions of telomerization to promote the telomerization and in the presence of a phosphoryl halide of the formula $$(W)_2-\overset{O}{\underset{\|}{P}}-Z$$

in which Z is a halogen and W is selected from at least one of the group consisting of alkoxy radicals, hydroxyl radicals, aryl radicals, alkyl radicals, hydrogen and halogen.

2. The process of claim 1 in which said phosphoryl halide is phosphorus oxychloride.

3. The process in claim 1 in which the said phosphoryl halide is phosphorus oxybromide.

4. The process in claim 1 in which the said phosphoryl halide is phosphorus oxyiodide.

5. The process in claim 1 in which the said phosphoryl halide is phosphorus oxybromodichloride.

6. The process in claim 1 in which the said phosphoryl halide is diethoxy phosphonyl chloride.

7. The process of claim 1 in which the mol ratio of phosphoryl halide to monomer is between about 1:2 and about 20:1.

8. A process for the production of a distillable open chain telomer which comprises telomerizing a polymerizable halogenated hydrocarbon containing a double bond between two carbon atoms and at least one halogen atom attached to at least one of the carbon atoms of the double bond at a temperature between about 25° C. and about 150° C. for a period of time between about 1 and about 4 hours under liquid phase and substantially anhydrous conditions in the presence of a free radical producing catalyst effective under the conditions of telomerization to promote the telomerization and in the presence of a phosphoryl halide of the formula $$(W)_2-\overset{O}{\underset{\|}{P}}-Z$$

in which Z is a halogen and W is selected from at least one of the group consisting of alkoxy radicals, hydroxyl radicals, aryl radicals, alkyl radicals, hydrogen and halogen in a mol ratio of between about 1:1 and about 10:1 with the monomer.

9. A process for the production of distillable open chain homotelomers which comprises homotelomerizing a polymerizable halogenated hydrocarbon containing a double bond between two carbon atoms and two fluorine atoms attached to at least one of the carbon atoms at a temperature between 0° C. and about 200° C. for a period of time between about ½ hour and about 10 hours under liquid phase and substantially anhydrous conditions in the presence of a peroxy type free radical producing catalyst effective under the conditions of telomerization to promote the telomerization in the presence of a phosphoryl oxychloride in a mol ratio between about 1:2 and about 20:1 with the monomer to produce a distillable open chain homotelomer and recovering the homotelomer thus produced.

10. The process of claim 9 in which said polymerizable compound is chlorotrifluoroethylene.

11. The process of claim 9 in which said polymerizable compound is tetrafluoroethylene.

12. The process of claim 9 in which said polymerizable compound is vinylidene fluoride.

13. The process of claim 9 in which said polymerizable compound is perfluorobutadiene.

14. A process for the production of a distillable open chain cotelomer which comprises telomerizing a polymerizable halogenated hydrocarbon containing a double bond between two carbon atoms and two fluorine atoms attached to at least one of the carbon atoms and another haloethylenic compound at a temperature between about 0° C. and about 200° C. for a period of time between about ½ hour and about 10 hours under liquid phase and substantially anhydrous conditions in the presence of a free radical producing catalyst effective under the conditions of telomerization to promote the telomerization in the presence of phosphoryl oxychloride in a mol ratio between about 1:2 and about 20:1 with the monomer.

15. A process for the production of distillable open chain homotelomers which comprises telomerizing chlorotrifluoroethylene at a temperature between about 25° C. and about 150° C. for a period of time between about 1 hour and about 4 hours under liquid phase and anhydrous conditions in the presence of benzoyl peroxide and phosphorus oxychloride.

16. A telomer of an ethylenically unsaturated halogenated hydrocarbon and a phosphoryl halide of the formula $$(W)_2-\overset{O}{\underset{\|}{P}}-Z$$

having the formula $$Z(X)_n\overset{O}{\underset{\|}{P}}-(W)_2$$

in which Z is halogen, X is at least one divalent halogenated hydrocarbon radical, $n$ is an integer from 2 to 20, and W is selected from the group consisting of hydrogen, halogen, hydroxyl, aryl, alkoxy having 1 to 10 carbon atoms, and alkyl having 1 to 10 carbon atoms.

17. The telomer of claim 16 in which the divalent halogenated hydrocarbon radical is chlorotrifluoroethylene.

18. A telomer of trifluorochloroethylene and phosphorous oxychloride having the formula:

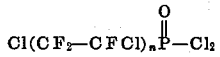

$$Cl(CF_2-CFCl)_n \overset{O}{\underset{\|}{P}}-Cl_2$$

in which $n$ is an integer from 2 to 20.

References Cited in the file of this patent

UNITED STATES PATENTS

| | | |
|---|---|---|
| 2,478,390 | Hanford | Aug. 9, 1949 |
| 2,559,749 | Benning | July 10, 1951 |
| 2,597,702 | Benning | May 20, 1952 |
| 2,671,079 | McCormack | Mar. 2, 1954 |

FOREIGN PATENTS

| | | |
|---|---|---|
| 651,656 | Great Britain | Apr. 4, 1951 |